United States Patent [19]
Huntington

[11] 3,791,102
[45] Feb. 12, 1974

[54] MULTIPLE COMPARTMENT PACKED BED ABSORBER-DESORBER HEAT EXCHANGER AND METHOD

[76] Inventor: Richard L. Huntington, Rt. No. 1, Van Buren, Ohio 45889

[22] Filed: June 10, 1971

[21] Appl. No.: 151,727

[52] U.S. Cl............................ 55/32, 55/53, 55/56, 55/228, 55/233, 165/60, 165/107, 261/20, 261/36, 261/98, 261/151
[51] Int. Cl............................................ B01d 47/14
[58] Field of Search..... 55/32, 53, 56, 90, 222, 233; 165/60, 107, 108; 281/20, 36 R, 98, 151

[56] References Cited
UNITED STATES PATENTS

| | | | |
|---|---|---|---|
| 2,054,809 | 9/1936 | Fleisher | 261/98 |
| 2,609,888 | 9/1952 | Beringer | 261/36 R |
| 2,946,726 | 7/1960 | Markels, Jr. | 261/36 R |
| 3,038,790 | 6/1962 | Beggs et al. | 261/98 |
| 3,255,573 | 6/1966 | Cox, Jr. | 55/45 |

FOREIGN PATENTS OR APPLICATIONS

| | | | |
|---|---|---|---|
| 821,003 | 9/1959 | Great Britain | 261/151 |
| 1,278,153 | 10/1961 | France | 261/151 |

*Primary Examiner*—Bernard Nozick
*Attorney, Agent, or Firm*—Owen & Owen; Richard D. Emch, Esq.

[57] ABSTRACT

The invention is a multiple compartment packed bed absorber-desorber heat exchanger. The absorber-desorber heat exchanger includes at least one set of upper and lower compartments containing suitable tower packing. Gas inlets, gas outlets and liquid distributors are provided for each packed bed chamber. The gas flows in the upper and lower compartments are isolated from each other by a liquid seal. The upper and lower packed beds are wetted by a common irrigation liquid or heat exchange fluid which gravitates downwardly through the packed beds to a sump and recycling pump. The dual packed beds can be operated to absorb and desorb gases, to concentrate gaseous contaminants, or to transfer heat and to condense vapors. Preferably, the dual packed bed chambers are of modular construction.

7 Claims, 13 Drawing Figures

PATENTED FEB 12 1974
3,791,102
SHEET 1 OF 4
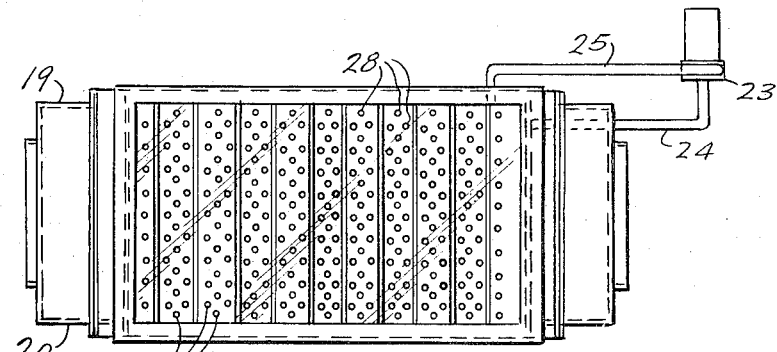
FIG-2-
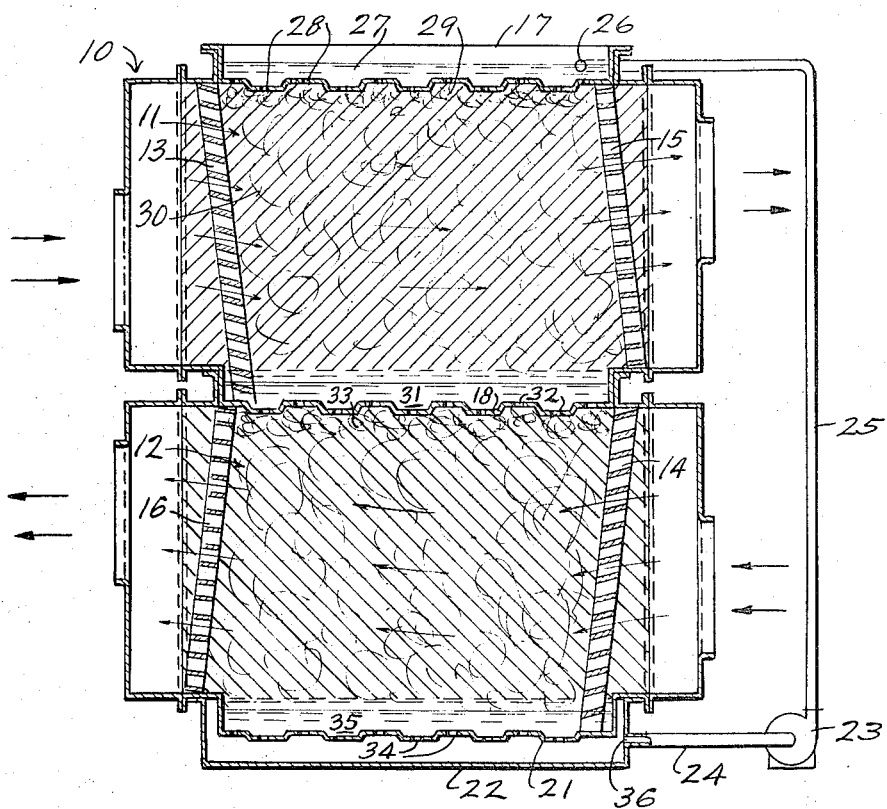
FIG-1-
INVENTOR:
RICHARD L. HUNTINGTON.
BY Owen & Owen
ATT'YS.

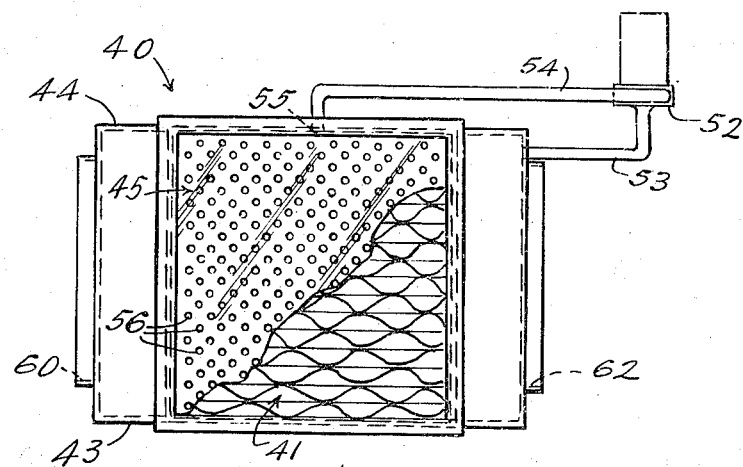
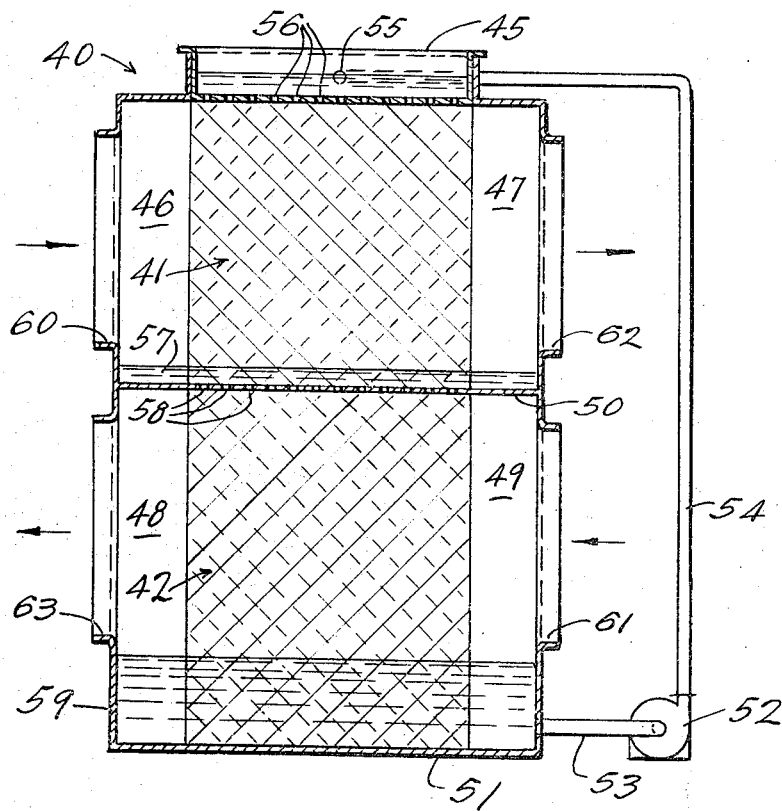

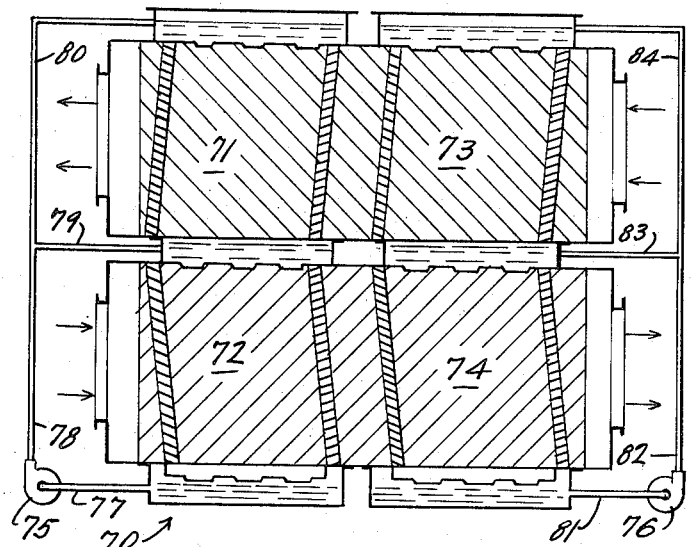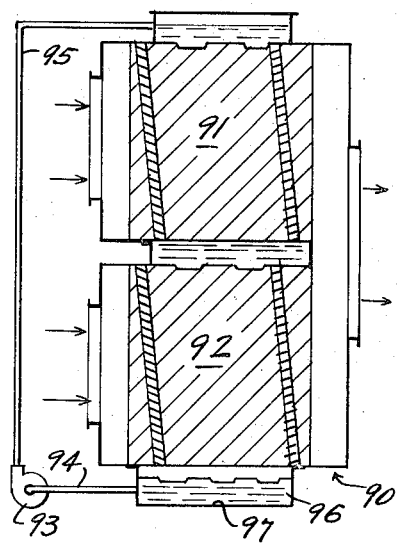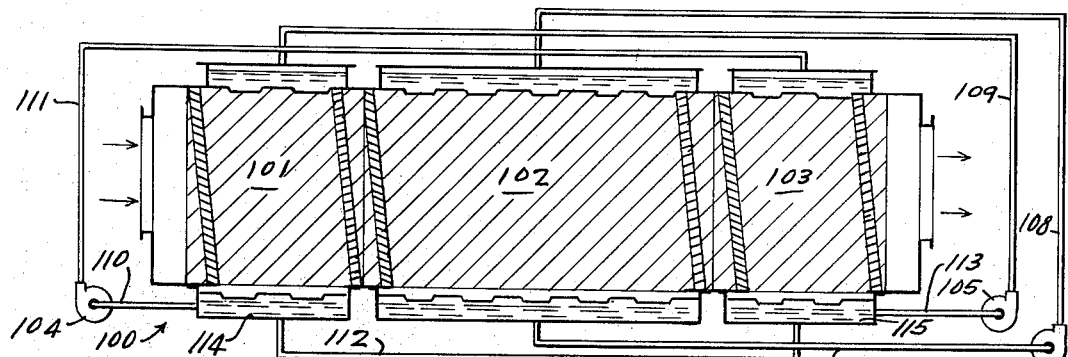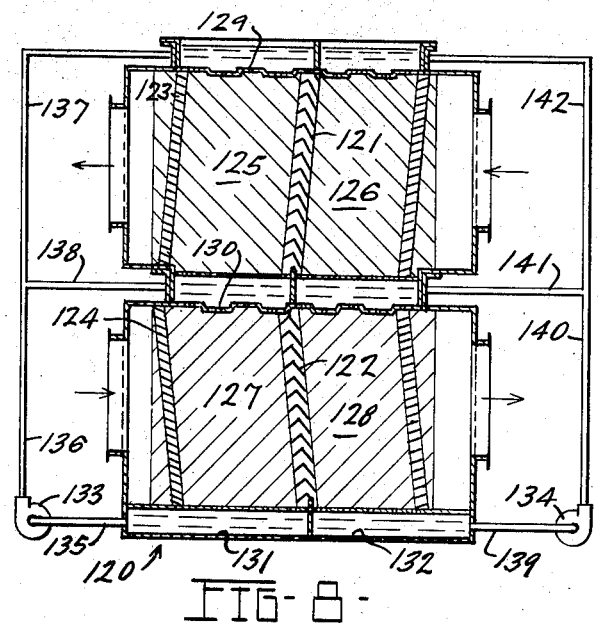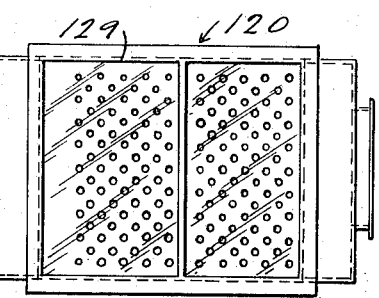

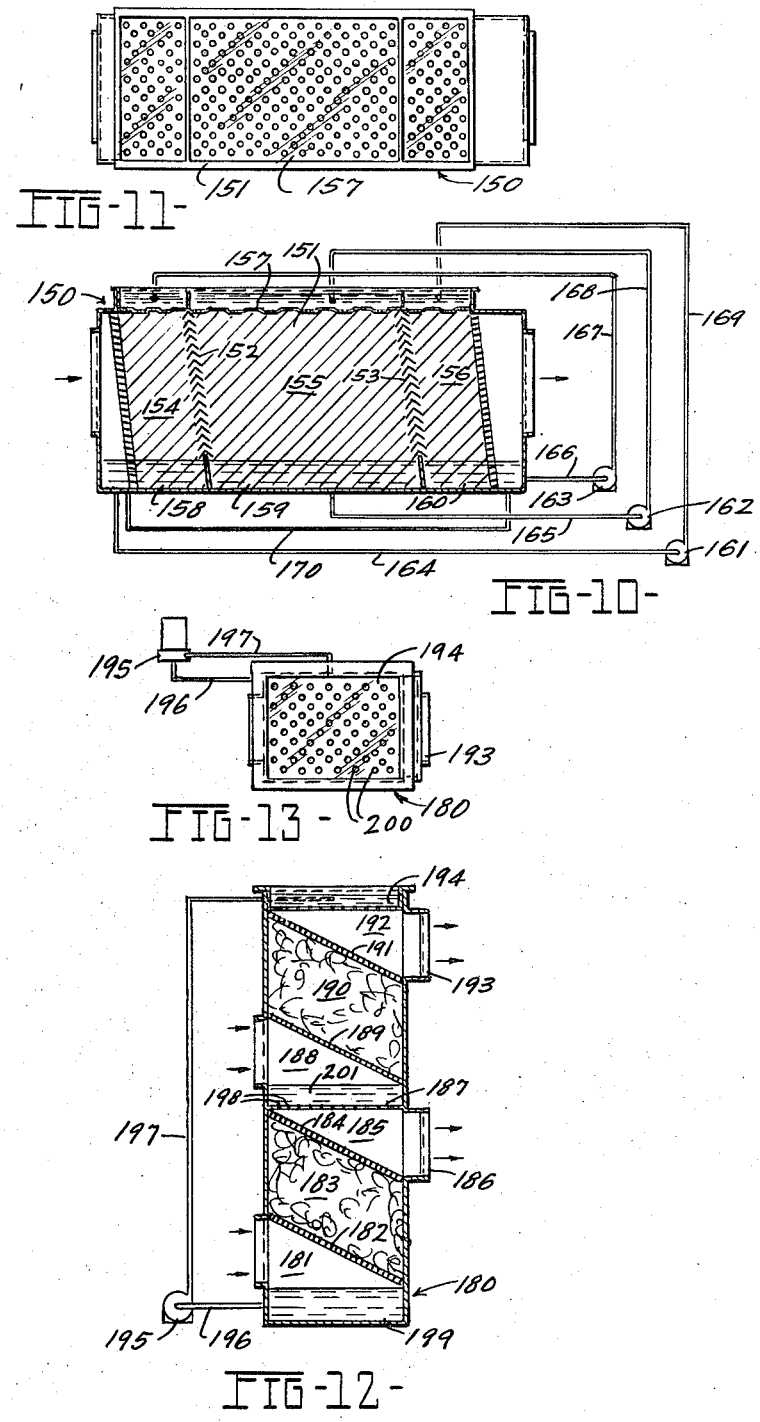

3,791,102

MULTIPLE COMPARTMENT PACKED BED ABSORBER-DESORBER HEAT EXCHANGER AND METHOD

BACKGROUND OF THE INVENTION

Packed bed fume scrubbers, commonly in use, employ a scrubbing liquid to remove gaseous and particulate air pollutants from a gas stream. When the gas stream is hot, cooling of the gas occurs in the scrubber by the evaporation of water from the scrubbing solution with a consequent reduction in absorption efficiency and a loss of stack draft due to reduced temperature and buoyancy. While water vapor by itself is not objectionable chemically, excess water vapor often concentrates air pollutants in scrubber tail gases. For example, sulfur dioxide reacts with water vapor in scrubber tail gases to form a sulfuric acid mist which results in critical pollutant concentrations adjacent the base of an exhaust stack. Under conditions where the scrubbing liquid is recirculated, particulate matter which has been trapped by the liquid is released when excessive evaporation occurs.

The control of a building air pollution level by ventilation is often limited by the ambient air pollution level. This often contributes to the overall air pollution level, and often results in an increase in heating and cooling plant costs as well as an increase in energy usage and cost. Increased energy usage in turn contributes to the overall air pollution level especially of the energy is supplied by coal or by the combustion of natural gas.

The recovery of heat from waste gases is often limited by the corrosive and fouling nature of the air pollutant. Roughness and dirt buildup on the surface of air heat exchangers results in a large reduction in heat transfer capacity due to a decrease in thermal conductance.

In conventional cross flow fume scrubber design and operation, solution concentration and temperature gradients occur across the bed. Liquid and air temperatures is the wet scrubber approach wet bulb temperatures which are below exit room temperatures. In the following improved cross flow and counter flow fume scrubber invention, the cooling resulting from water evaporation, solution concentration and temperature gradients are utilized to recover heat and to cool ventilation air as well as to control vapor plume emissions from wet scrubbers.

SUMMARY OF THE INVENTION

This invention relates to packed bed wet fume scrubbers for air pollution control and more particularly to an improved multiple chamber cross flow packed bed absorber-desorber for the recovery of heat from exhaust gases, the concentration of gaseous contaminants and the reduction of vapor plume formation when hot gases are cleaned with water.

A multiple bed cross flow absorber-desorber heat exchanger, according to the present invention, includes a shell defining an upper and lower hollow chamber. The chambers are provided with gas inlet-outlets, suitable tower packing and liquid distributors. Gas flow in the upper and lower compartments is isolated from the atmosphere and each other by liquid seals. The packed beds are wetted by a common irrigation liquid which gravitates downward through the packed beds to a common sump and recycling pump. The packed beds may be operated to absorb and desorb both gaseous contaminants and heat. Heat transfer is accomplished by recirculating a low vapor pressure heat transfer fluid. Mass transfer is accomplished by the use of aqueous absorber solutions. The packed beds are of modular construction and may be stacked and/or mounted in series and may be operated to both scrub and recover heat from waste gases.

It is an important object of the present invention to provide a heat exchanger of improved design capable of operating at a high efficiency level, while simultaneously presenting minimum impedance to gas flow.

It is an object of the present invention to provide a modular packed bed absorber-desorber heat exchanger which can be used in a large number of applications and can be produced in large quantities at low cost.

An object of the present invention is to provide an economical process for the recovery of heat from exhaust gases and the reduction of overall thermal and chemical air pollution level.

Another important object of the present invention is to provide a process for the utilization of the adiabatic cooling effect in the cross flow wet fume scrubber to cool and condition make-up ventilation air.

Still a further object of the present invention is to provide an economical heat transfer process for increasing absorber tail stack gas buoyancy.

Still an additional object of the present invention is to provide an economical process for the reduction of vapor plume formation from wet scrubbers; the reduction of water usage; and a resultant reduction in air pollution.

Still another important object of the present invention is to provide a means for concentrating gaseous contaminants by absorption and desorption utilizing temperature differences and selective solvents.

Still a further object of the present invention is to provide a corrosion resistant and self-cleaning packed bed heat exchanger.

Still additional objects, benefits, and advantages of the present invention will become evident from a study of the following detailed description taken in conjunction with the accompanying drawings.

BRIEF DESCRIPTION OF THE DRAWINGS

FIG. 1 is a sectional view of a dual chambered cross flow type packed absorber-desorber of modular design showing the internal construction thereof, made in accordance with the present invention;

FIG. 2 is a top view of the absorber shown in FIG. 1;

FIG. 3 is a sectional view of another embodiment of the present invention showing the internal construction thereof;

FIG. 4 is a top view with parts broken away of the absorber-desorber shown in FIG. 3;

FIG. 5 is a sectional view of a modular unit of a packed bed absorber-heat exchanger used for heat recovery and gas purification;

FIG. 6 is a sectional view of a modular unit of a packed bed absorber-heat exchanger used for the condensation of water vapor;

FIG. 7 is a sectional view of a modular unit of a cross flow packed bed heat exchanger and absorber for vapor plume suppression and improved absorber performance made in accordance with the present invention;

FIG. 8 is a sectional view of a dual packed bed cross flow absorber-heat exchanger with partitions for heat recovery and air purification;

FIG. 9 is a top view of the heat exchanger-absorber shown in FIG. 8, made in accordance with the present invention;

FIG. 10 is a sectional view of a multiple chambered packed bed cross flow heat exchanger absorber according to the present invention;

FIG. 11 is a top view of the heat exchanger absorber cross flow scrubber shown in FIG. 10;

FIG. 12 is a sectional view of a counter flow dual chambered packed bed absorber-heat exchanger made in accordance with the present invention; and FIG. 13 is a top view of the counter flow packed bed absorber-heat exchanger shown in FIG. 12.

DESCRIPTION OF THE PREFERRED EMBODIMENTS

Referring to FIGS. 1 and 2, a dual compartment horizontal cross flow packed bed absorber-heat exchanger according to the present invention is generally indicated by the reference number 10. The heat exchanger 10 includes upper and lower packed bed chambers 11 and 12; gas inlet grills 13 and 14; gas outlet grills 15 and 16; corrugated sieve plate distributors 17 and 18; corrugated side walls 19 and 20; a corrugated packed bed support plate 21; a liquid sump pan 22; an auxiliary pump 23; and piping 24 and 25. The corrugated sieve plate liquid distributor 18 serves as a sieve plate distributor for the lower packed bed 12; as a support plate for the packed bed 11; and as a liquid seal between the packed beds.

In operation, liquid enters the sieve plate distributor 17 through a liquid inlet port 26 and is distributed across the distributor pan 17 forming a liquid seal indicated by the reference number 27. The liquid passes downward through a plurality of holes 28 in the distributor pan 17 (see FIG. 2) into the packed bed chamber 11 where the liquid stream from the individual perforations are disbursed by a shallow layer of small diameter packing 29 supported by large diameter packing 30 in the packed bed 11. The layer of small diameter packing 29 serves both to distribute liquid over the large diameter packing 30 and to increase gas flow resistance along the underside of the distributor pan 17 holding the packed bed 11 in compression.

The irrigation liquid flows downward through the packed bed 11 to the distributor-support plate 18 and collects on the pan to form a liquid seal indicated by the reference number 31. The liquid is redistributed and flows through perforations 32 in the distributor pan 18, through a layer of small diameter packing 33 and packed bed 12, exiting through a plurality of holes 34 in the support plate 21, into the sump pan 22 where the liquid collects to form a liquid seal indicated by the reference number 35 along the bottom of the bed 12. The liquid leaves the sump pan 22 through an outlet port 36 and is returned to the distributor 17 by the pump 23 and piping 24 and 25.

Gas enters the inlet grills 13 and 14 and passes horizontally through the packed beds 11 and 12 coming in contact with down flowing irrigation liquid where heat and mass transfer occurs. The scrubbed gases exit from the packed beds 11 and 12 through the outlet grills 15 and 16.

If the two gas streams differ in temperature and the irrigation liquid consists of a low vapor pressure heat transfer fluid such as oil, heat will be transferred from the hot gas stream to the oil and from the hot oil to the cold gas stream. The dual packed bed then becomes an effective heat exchanger and can be used to recover heat from exhaust air, flue gas, and waste gases at moderate temperatures.

If the gas streams differ in humidity and temperature and the irrigation liquid consists of an aqueous desiccant solution, both heat and moisture will be transferred from one gas stream to the other. The dual packed bed can then be used to suppress the evaporation of liquid thereby reducing heat loss from open process tanks and from wet scrubbers.

In a method using the FIG. 1 and 2 embodiment, heat and moisture can be recovered from a warm ventilation air stream which enters the upper packed bed chamber 11. A cold ventilation air stream is introduced in the lower packed bed chamber 12. Both air streams are passed in differential contact with a common recycle heat transfer liquid stream comprising an admixture of liquid paraffin and polypropylene glycol. The liquid stream is distributed to the chambers 11 and 12 by the distribution pan 17. The liquid stream continuously absorbs heat and moisture from the warm ventilation air by contact with the heat transfer liquid in the chamber 11 and continuously desorbs the heat and moisture to the cold ventilation air stream by contact with the heat transfer liquid stream in the lower chamber 12.

FIGS. 3 and 4 show another embodiment of a dual bed packed bed absorber-desorber heat exchanger 40. The heat exchanger 40 includes an upper packed bed chamber 41 and a lower packed bed chamber 42 defined by side walls 43 and 44; an upper sieve plate distributor pan 45; gas inlet-outlet plenum chambers 46, 47, 48 and 49; an intermediate sieve plate partition 50; a bottom wall 51; a recirculation pump 52; and interconnecting pipes 53 and 54. In operation, liquid enters a distributor pan inlet port 55 and is distributed over the distributor pan 45 forming a liquid seal. The liquid flows downwardly into the upper packed bed chamber 41, through a plurality of holes 56 defined by the distributor pan 45. The liquid passes over the packing, which consists of criss-cross corrugated sheeting, and collects on the sieve plate partition 50 forming a liquid seal 57. The liquid flows through holes 58 in the perforated partition 50 and downward over the surface of the bed 42 to a base 59 of the exchanger 40, where it is returned to the top distributor 45 by the pump 52 and piping 53 and 54. Gas streams enter inlets 60 and 61. The gas flows through the packed beds 41 and 42, where mass and heat transfer occurs by direct contact with the irrigation liquids, and exits through the outlets 62 and 63.

Wall corrugations and inlet-outlet grills are unnecessary in the design shown in FIG. 3 because the packing consists of evenly spaced self-supporting modular crisscross sheets which redistribute the irrigation liquid. The sheets are parallel to both the liquid and the gas flow. Entwined wire mesh packing can be used with efficiency as a packing. The tower fill preferably should be made from materials which are thermally conductive, corrosion resistance and which are easily wetted by the irrigation liquid. The heat transfer fluid should have a high thermal conductance; exhibit a low vapor pressure over the operating temperature range; be fire resistant and be low in viscosity. For high temperature ranges, from 400° to 500°F., the heat transfer fluid can consist of a plastic polymer dissolved in a low vapor pressure plasticizer.

A modular unit 70 is shown in FIG. 5. The unit 70 includes four cross flow packed bed chambers 71, 72, 73 and 74; auxiliary pumps 75 and 76; and piping 77–84. The unit 70 is designed for the purpose of recovering heat and purifying ventilation air. When heat is to be receovered from exhaust gases in winertime, the irrigation liquid in the lead packed bed compartments 71 and 72 consists of heat transfer fluid which is recirculated through the packed bed chambers 71 and 72 through the pump 75 and interconnecting piping 77, 78 and 80. The back packed bed compartments 73 and 74 are irrigated with an aqueous dessicant solution when the latent heat of vaporization is to be recovered from the exhaust gas or a chemical solution when the air is to be purified. The aqueous solution is circulated through the packed bed chambers 73 and 74 by the pump 76 and piping 81, 82 and 84 or through the bypass piping 83 when the incoming air does not require purification.

When refrigeration is to be recovered from exhaust ventilization air in summertime, the lead packed bed chambers 71 and 72 are preferentially operated with aqueous solutions and the back packed bed chambers 73 and 74 are operated with heat transfer fluid so as to be able to take advantage of adiabatic cooling caused by the evaporation of water from the scrubbing solution which results in a net gain in refrigeration if the lead packed bed chamber 71 is operated below capacity. The exhaust gas to be cleaned is preferentially passed through the lower packed bed chambers 72 and 74.

Another modular unit 90 is shown in FIG. 6. The unit 90 includes two cross flow packed bed chambers 91 and 92; an auxiliary pump 93; piping 94 and 95; and a flow condensate overflow 96. The unit 90 is used for condensing water vapor and for the elimination of vapor plumes from wet scrubbers. Heat transfer fluid is circulated in the packed beds 91 and 92 through the pump 93 and piping 94 and 95. Cold air enters the packed bed 91, cooling the down flowing heat transfer fluid. The cold air is heated by the fluid and combines with cold dehumidified air which enters the lower packed bed chamber 92 as warm saturated air. The water vapor is condensed from the warm saturated air by direct contact with down flowing cold heat transfer fluid. The condensate and heat transfer fluid are decanted in a base sump 97. The excess condensate is removed from the sump 97 through the overflow 96 and the heat transfer fluid is recycled to the packed bed cooling chamber 91 through the pump 93 and the piping 94 and 95.

FIG. 7 shows a unit 100 having three modular cross flow packed bed chambers for the purpose of precooling absorber gas, absorbing and reheating absorber tail gas. The unit 100 includes a packed bed gas precooling chamber 101, a packed bed absorption chamber 102, a packed bed absorber tail gas heating chamber 103, auxiliary pumps 104, 105 and 106, and piping 107–113. In operation, the warm contaminated gas passes horizontally through the packed bed chamber 101 and is cooled by down flowing cold heat transfer fluid, which is warmed by the gas and collects in a sump pan 114 where it is returned to the packed bed absorber tail gas reheat chamber 103 by the pump 104 through the interconnecting piping 110 and 111. The cooled gas passes through the packed bed absorption chamber 102 into the tail gas reheat chamber 103 where it is reheated by the warm heat transfer fluid flowing downward through the packed bed to a sump chamber 115. The cooled heat transfer fluid is returned to the packed bed gas cooling chamber 101 by the pump 105 and interconnecting piping 113 and 109. The pump 106 and interconnecting piping 107 and 108 serve to recycle absorber solution while the piping 112 compensates for unequal recycle pump capacity by equalizing the liquid levels in the heat transfer fluid sumps 114 and 115.

The heat extracted from hot gases may also be used in the desorption of gases by direct absorption solution and heat transfer fluid contact or used as a source of thermal energy.

FIGS. 8 and 9 disclose a dual bed absorber 120 employing chevron-shaped partitions 121 and 122 to partition the dual packed beds 123 and 124 into compartments 125, 126, 127 and 128. Partitioned distributors 129 and 130 and partitioned sumps 131 and 132 are also provided. The absorber 120 also includes auxiliary pumps 133 and 134, and piping 135–142. The partitioned dual bed packed bed absorber 120 is an alternate embodiment to the unit 70 (FIG. 5).

A multiple chambered cross flow packed bed absorber 150 is shown in FIGS. 10 and 11. The absorber 150 includes a packed bed 151 which is divided by chevron partitions 152–153 into a packed bed gas cooling chamber 154, a packed bed absorption chamber 155, and an absorber tail gas reheat packed bed chamber 156. The absorber 150 also includes a partitioned distributor pan 157; partitioned sumps 158, 159 and 160; auxiliary pumps 161, 162 and 163; and piping 164–170. The absorber 150 is an alternate embodiment to the modular absorber unit 100 shown in FIG. 7.

FIGS. 12 and 13 show another embodiment of the present invention. A unit 180 employs counter flow packed bed chambers for heat transfer. The unit 180 includes a sump and gas inlet chamber 181, a slanting packed bed support grid 182, a packed bed chamber 183, a slanting packed bed hold down grid 184, a gas outlet chamber 185, a mist eliminator filter outlet 186, a liquid sieve plate distributor partition 187, a gas inlet plenum and sump chamber 188, a slanting packed bed support plate grill 189, a slanting packed bed chamber 190, a slanting packed bed hold down grill 191, a gas outlet plenum chamber 192, a mist eliminator filter outlet 193, a sieve plate distributor pan 194, an auxiliary pump 195, and piping 196 and 197.

In operation, gas enters the inlet chamber 181, passes upward through the slanting support plate grid 182, packed bed chamber 183, packed bed hold down grill 184 and into the gas outlet chamber 185. The gas then passes out of the outlet chamber 185 through the mist eliminator filter outlet 186. Heat transfer fluid enters the gas outlet chamber 185 through perforations 198 in the sieve plate partition 187 and passes downward through the packed bed hold down grid 184; packed bed chamber 183; support grid 182; inlet plenum chamber 181; and collects in a sump 199. The fluid is returned to the upper distributor pan 194 by the pump 195 and interconnecting piping 196 and 197. Gas entering the upper gas inlet plenum chamber 188 passes upward through the slanting packed bed support plate 189, through the packed bed 190, through the hold down grid 191 and into the gas outlet chamber 192. The gas exits through the gas outlet mist eliminator outlet 193. Heat transfer fluid entering the sieve plate distributor pan 194 passes through a plurality of holes 200 in the pan 194; through the gas outlet plenum chamber 192; through the slanting hold down grid 191; through the packed bed chamber 190; through the slanting support plate grill 189; through the gas inlet chamber 188 and collects on the sieve plate distributor partition 187. This forms a liquid seal 201. The fluid flows through the perforations 198 into the gas outlet chamber 185. The direction of heat and mass transfer is dependent upon the temperature difference and concentration gradient.

While the above packed bed heat exchanger and absorber designs, according to the present invention, have been described with particular reference to the embodiments shown in the drawings, many changes may be made in the detailed construction. These include, for examples, the use of distributor covers, slanting the distributor and packed bed to compensate for the pressure drop across the cross flow packed bed, and the use of permanent liquid weir box trough distributor seals.

The operation of an absorber at reduced temperatures by means of external refrigeration, and by the recovery of refrigeration from the absorber tail gas, can drastically reduce absorber packed bed volume.

Additional advantages will become apparent from a review of the appended claims.

What I claim is:

1. A multiple compartment absorber-desorber heat exchanger comprising, in combination, shell means including an upper rectangular housing circumjacent a lower rectangular housing for defining at least one upper packed bed chamber and at least one lower packed bed chamber, said upper and lower packed bed chambers having packed material therein, first distributor means including a rectangular distributor plate adjacent the upper portion of said upper packed bed chamber for distributing a heat exchange liquid downwardly through said upper chamber, second distributor means including a rectangular distributor plate spaced between said upper packed bed chamber and said lower packed bed chamber for distributing the heat exchange liquid downwardly through said lower packed bed chamber, first opposed inlet and outlet means defined in opposed sides of said shell means adjacent said upper packed bed chamber for directing gas in a path transverse to the path of the heat exchange liquid, second opposed inlet and outlet means defined in opposed sides of said shell means adjacent said lower packed bed chamber for directing gas in a path opposed to the gas path through the upper packed bed chamber and transverse to the path of the heat exchanger liquid, a sump positioned below said lower packed bed chamber and means for recirculating heat exchange liquid from said sump to said first distributor means.

2. A multiple compartment horizontal cross flow packed bed absorber-desorber heat exchanger comprising, in combination, upper and lower hollow shells, said shells being upwardly open and vertically aligned, said shells having side walls, corrugated bottom walls, and opposed inlet and outlet means, and partition means for defining upper and lower packed bed compartments, said packed bed compartments including packing material means for distributing liquid downwardly through said upper and lower packed bed compartments and means for collecting the liquid.

3. A multiple compartment horizontal cross flow absorber-desorber heat exchanger as set forth in claim 2, wherein said packing material in said packed bed chamber includes an upper layer of small diameter tower packing and a lower layer of large diameter tower packing.

4. A multiple compartment horizontal cross flow absorber-desorber heat exchanger as set forth in claim 2, wherein said partition means comprises grills having spaced cross members, said grills being tilted in the direction of gas flow.

5. A multiple compartment horizontal cross flow packed bed absorber-desorber heat exchanger as set forth in claim 2, wherein said distributing means includes a flow distributor having a corrugated bottom wall, with said distributor being positioned on said upper shell above said upper packed bed compartment.

6. A multiple compartment horizontal cross flow packed bed absorber-desorber heat exchanger as set forth in claim 5, wherein said distributing means includes a perforated distributor for distributing the liquid to said lower shell, said perforated distributor being positioned between said upper and lower hollow shells.

7. A method of recovering heat and moisture from warm ventilation air comprising the steps of irrigating with a common recycled heat transfer liquid stream two or more stacked packed bed chambers, whereby a warm ventilation air stream and a cold ventilation air stream are passed in differential contact with the common recycled heat transfer liquid stream comprising an admixture of liquid paraffin and polypropylene glycol, continuously absorbing heat and moisture from said warm ventilation air by contact with the heat transfer liquid stream in an upper packed bed chamber and continuously desorbing said heat and moisture to the cold ventilation air stream by contact with the heat transfer liquid stream in a lower packed bed chamber.

* * * * *